US005634755A

United States Patent [19]

Jones, Jr.

[11] Patent Number: 5,634,755

[45] Date of Patent: Jun. 3, 1997

[54] MAGNETIC DRAIN BOLT

[75] Inventor: James D. Jones, Jr., Palatine, Ill.

[73] Assignee: Illinois Tool Works Inc., Glenview, Ill.

[21] Appl. No.: 626,078

[22] Filed: Apr. 1, 1996

[51] Int. Cl.$^{6}$ .............................. F16B 35/02; F16B 35/06

[52] U.S. Cl. ............................ 411/383; 411/396; 335/302

[58] Field of Search ..................................... 411/383, 384, 411/386, 393, 396; 335/302, 305; 470/11, 12

[56] References Cited

U.S. PATENT DOCUMENTS

| | | | |
|---|---|---|---|
| 1,281,842 | 10/1918 | Rosnick et al. . | |
| 1,394,608 | 10/1921 | Davern | 411/384 X |
| 2,242,830 | 5/1941 | Lisle | 209/215 |
| 2,755,932 | 7/1956 | Cohn | 210/1.5 |
| 2,870,384 | 1/1959 | Brooks | 317/201.5 |
| 3,055,100 | 9/1962 | Kimpel | 411/375 X |
| 3,126,617 | 3/1964 | Blume | 335/302 X |
| 3,370,144 | 2/1968 | Arthur et al. | 210/222 |
| 3,800,914 | 4/1974 | Miyata | 184/6.25 |
| 4,810,148 | 3/1989 | Aisa et al. | 411/383 |
| 4,834,464 | 5/1989 | Frehse | 301/108 |
| 5,089,129 | 2/1992 | Brigman | 210/223 |
| 5,150,769 | 9/1992 | Major et al. | 184/31 |
| 5,150,975 | 9/1992 | Major et al. | 384/465 |
| 5,314,625 | 5/1994 | Farnelli | 210/695 |
| 5,465,078 | 11/1995 | Jones, Jr. | 335/305 |

*Primary Examiner*—Neill R. Wilson

*Attorney, Agent, or Firm*—Thomas W. Buckman; John P. O'Brien; Donald J. Breh

[57] ABSTRACT

A magnetic drain bolt comprising: a bolt body and a magnet, the bolt body comprises a male-threaded member and a head member, the male-threaded member has an axial bore formed at a bottom end thereof for receiving the magnet, the male-threaded member further has a substantially circular lip extending axially inward at a bottom edge of the axial bore; the magnet consists of a cylindrical base and a cylindrical projecting extremity, the cylindrical base is sized to fit within the axial bore and has a diameter slightly larger than an inner diameter of the circular lip, the cylindrical projecting extremity extends axially from the cylindrical base and has a diameter slightly smaller than an inner diameter of the circular lip and thereby defines an indented circular shoulder along a bottom edge of the cylindrical base and along a top edge of the cylindrical projecting extremity, wherein the cylindrical base is fitted within the axial bore and the circular lip extends over the indented circular shoulder against the top edge of the circular projecting extremity thereby securing the cylindrical base within the axial bore with the circular projecting extremity extending axially beyond the bottom end of the male-threaded member.

10 Claims, 1 Drawing Sheet

MAGNETIC DRAIN BOLT

BACKGROUND OF THE INVENTION

1. Field of the Invention

The present invention relates generally to an improved, low cost magnetic drain bolt, and more particularly to a drain bolt having a magnet secured at an end thereof for attracting metallic particles in an oil pan of an automobile to prevent the metallic particles from interfering with sensors within the engine.

2. Description of the Prior Art

In an automobile engine, oil circulates between the engine, a reservoir and an oil pan. Oil is used to lubricate the engine to diminish the friction between the piston and the cylinder. This friction can cause small metal shavings and other debris to circulate in the oil. The oil is also used to convey heat and debris from the engine. An oil filter is typically used in the circulation path of the oil to filter out debris and particles in the oil. However, small metal shavings in the oil are not always filtered and cannot only cause excessive wear on the engine, but can also disrupt sensors that are now found in the engines of many vehicles, such as a crank shaft position sensor. These sensors can give false readings if too many metal shavings and particles come into contact with the sensor. It is therefore desirable to provide a method of removing such particles from the oil to prevent excessive wear on the engine and to enable the sensors in the engine to work properly.

One solution is to provide a magnetic drain plug positioned in the plug hole of an oil pan. Different types of magnetic drain plugs exist, however, they are either not strong enough to attract the metal shavings and particles in the oil or they are too costly to manufacture.

Conventional magnetic drain bolts typically have a magnet inserted into a recess on the bolt. Such conventional drain bolts require the magnet to be attached to the bolt body using an adhesive and/or press fitting the magnet within the recess. Adhesives do not always work properly and can cause the magnet to dislodge from the drain bolt due to exposure to hot oil within the oil pan or just dropping the drain bolt on the ground. Adhesively secured magnets can also fall off when handling the bolts during shipping and assembly. The press fitting techniques disclosed in the prior art would require placing excessive forces onto the magnet that could damage low cost magnets such as sintered ferrite slugs. Other magnetic type of drain bolts disclose the use of different types of magnets, such as synthetic resin, rare earth or ceramic type magnets. These types of magnets are more expensive than sintered ferrite magnetic materials and further increase the cost of the magnetic drain bolt.

Conventional magnetic drain bolts can initially have a strong magnetic force when first magnetized. After the magnetic drain bolts come into contact with other magnetic drain bolts and/or magnets, the magnetic force of the drain bolt is "knocked down" and becomes weaker. Such conventional magnetic drain bolts are typically knocked down during the shipping process and can degrade from 40–60 percent, thereby ultimately providing a much weaker drain bolt than initially created and therefore not providing the magnetic force necessary to attract metallic particles and shavings in an oil pan of an engine.

These and other types of magnetic drain bolts disclosed in the prior art do not offer the flexibility, robust structure and inventive features of the magnetic drain bolt described herein. As will be described in greater detail hereinafter, the magnetic drain bolt of the present invention differs from those previously proposed.

It therefore would be desirable to provide a low cost magnetic drain bolt that does not use adhesive and does not assert a significant force on the magnet which could tend to damage the magnet. It is further desirable to provide a magnetic drain bolt that is similar in size and length to a non-magnetic drain bolt, easy to manufacture, less expensive to manufacture, degrades less than conventional magnetic drain bolts after being knocked down and still provides a strong magnetic attraction in order to attract metallic shavings and particles in an oil pan of an engine.

SUMMARY OF THE INVENTION

According to the present invention I have provided a magnetic drain bolt comprising: a bolt body and a magnet, the bolt body comprises a male-threaded member and a head member, the male-threaded member has an axial bore formed at a bottom end thereof for receiving the magnet, the male-threaded member further has a lip extending radially inward at a bottom edge of the axial bore; the magnet consists of a base and a projecting extremity, the base is sized to fit within the axial bore and has a maximum transverse dimension slightly larger than an inner transverse dimension of the lip, the projecting extremity extends axially from the base and has a transverse dimension slightly smaller than an inner transverse dimension of the lip and thereby defines an indented shoulder along a bottom edge of the base and along a top edge of the projecting extremity, wherein the base is fitted within the axial bore and the lip extends over the indented shoulder against the top edge of the projecting extremity thereby securing the base within the axial bore with the projecting extremity extending axially beyond the bottom end of the male-threaded member.

Another feature of my invention relates to the magnetic drain bolt described above, wherein the preferred embodiment of the projection extremity is cylindrical.

Yet another feature of my invention relates to the process of making a magnetic drain bolt, which comprises the steps of: forming a bolt body with a male-threaded member and a head member, the male threaded member being formed with an axial bore at a bottom end thereof, forming a sintered ferrite slug of a magnetizable material with a base and a projection extremity, the base being formed having a depth slightly smaller than a depth of the axial bore and having a slightly smaller transverse dimension than an inner transverse dimension of axial bore, the projection extremity being formed having at least circumferential portions creating a transverse dimension slightly smaller than a transverse dimension of the base and extending axially from the base thereby defining a shoulder along a bottom edge of the base; telescopically inserting the base of the sintered ferrite slug within the axial bore of the bolt body; crimping a bottom edge of the male threaded member at a bottom edge of the axial bore over the shoulder and against the projecting extremity to create a lip whereby an inner transverse dimension of the lip is decreased to a dimension slightly less than a maximum transverse dimension of the base and slightly larger than a minimum transverse dimension of the projection extremity, wherein the crimping is done in a manner that does not exert an excessive force on the sintered ferrite slug that could damage the slug; and magnetizing the sintered ferrite slug.

DESCRIPTION OF THE DRAWINGS

Various objects, features and attendant advantages of the present invention will become more fully appreciated and more readily apparent from the following detailed description, when considered in connection with the accompanying drawings, in which like reference characters designate like or corresponding parts throughout the several views, and wherein.

DESCRIPTION OF THE PREFERRED EMBODIMENTS

Figure 1:
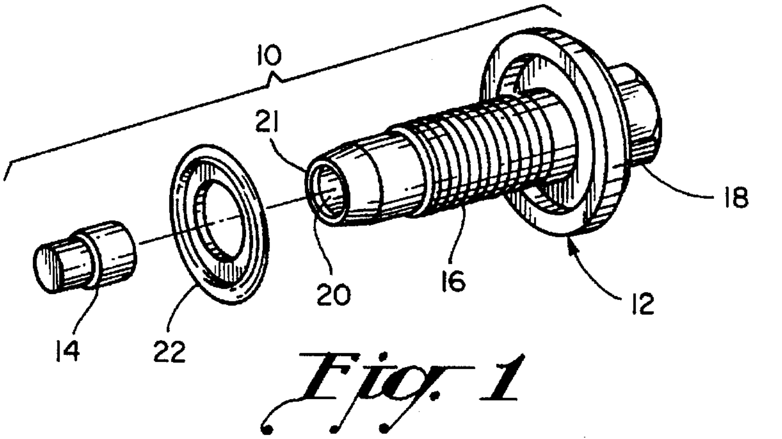
FIG. 1 is a perspective exploded view of the magnetic drain bolt embodying important features of my invention.
Figure 2:
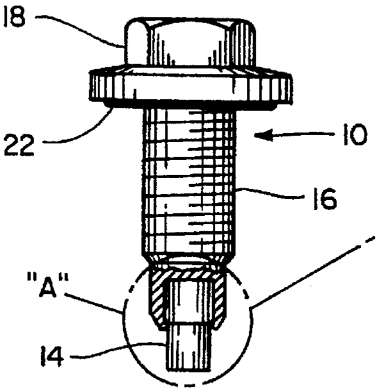
FIG. 2 is a side view, partially cut away, showing how the magnet is attached to the drain bolt.
Figure 3:
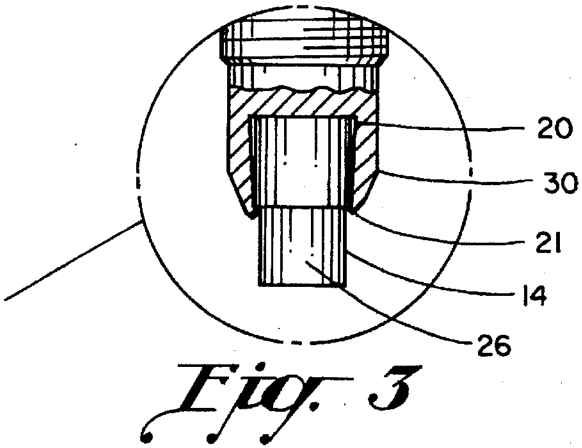
FIG. 3 is an enlarged view of the encircled area A of FIG. 2.
Figure 4:
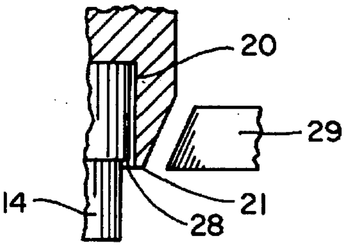
FIG. 4 is a side view, partially cut away, of the magnetic drain bolt showing how the magnet is placed into the bolt body.
Figure 5:
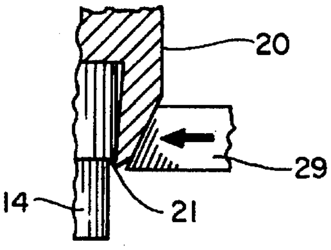
FIG. 5 is a side view, partially cut away, of the magnetic drain bolt showing how the magnet is secured within the bolt body.
Figure 6:
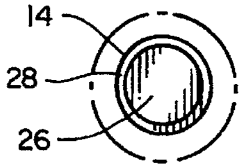
FIG. 6 is a bottom plan view of the drain bolt magnet shown in FIGS. 1–5.

Referring now to the drawings, FIGS. 1 and 2 show my new and improved magnetic drain bolt 10. The magnetic drain bolt comprises a steel bolt body 12 and a magnet 14. The bolt body 12 comprises a male-threaded member 16 and a hexagonal head member 18. A recess or an axial bore 20 is formed at one end of the male-threaded member 16 opposite the hexagonal head member 18. The axial recess forms a rim or a lip 21 at a bottom edge of the axial bore 20. The lip 21 extends radially inward for securing a magnet within the axial bore. An O-ring seal 22 can additionally be used with the magnetic drain bolt 10 to provide additional sealing protection when fastening the magnetic drain bolt 10 to an oil pan of an engine.

The magnet 14 shown in FIGS. 3–7 is made of a sintered ferrite material. Excellent results can be obtained by using a sintered aluminum-nickel-cobalt material known as "sintered alnico/8" manufactured by Arnold Engineering in Marengo, Ill. It is contemplated that other magnetic materials can also be used such as synthetic resins, ceramics, rare earth and others, however, they are more expensive than sintered ferrite materials and would increase the cost of the magnetic drain bolt. The sintered ferrite material can be easily shaped and can then be magnetized after it is secured within the axial bore of the magnetic drain bolt.

Referring to FIGS. 3–6, the magnet 14 is preferably formed into a cylindrical shape having a cylindrical base 24 and a circular projecting extremity 26. The projecting extremity extends axially from the cylindrical base and defines a circular shoulder 28 along a bottom edge of the cylindrical base 24 and along a top edge of the projecting extremity 26. The sintered aluminum-nickel-cobalt material can be press formed into the shape required for the embodiment shown in FIGS. 1–7. The base 24 is sized to fit within the axial bore 20 and has a height slightly smaller than the depth of the axial bore. The diameter or transverse dimension of the base is sized slightly smaller than an inner diameter or inner transverse dimension of the bore 20, thereby allowing the magnet to fit within the axial bore. After the magnet is inserted within the axial bore, the bottom edge of the male threaded member at a bottom edge of the bore is crimped using a crimping device 29 over the shoulder 28 to create a lip, whereby the inner diameter or transverse dimension of the bottom edge of the bore is decreased to a dimension slightly less than a transverse dimension of the base and slightly larger than a transverse dimension of the projecting extremity, thereby securing the base within the axial bore with the projecting extremity extending beyond the bottom end of the male-threaded member. The lip is crimped in such a manner that it does not exert an excessive damaging force against the sintered ferrite slug or magnet 14.

Figure 7:
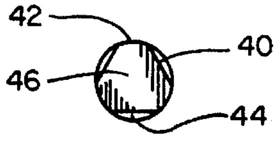
FIG. 7 is a bottom plan view of an alternate embodiment of a drain bolt magnet.

The magnet can have a variety of shapes that would enable the magnet to be secured and crimped to the magnetic drain bolt (FIG. 7). Such an alternate embodiment is shown in FIG. 7. Such shapes would include having a plurality of circumferentially spaced shoulders or indentations 40 on the magnet 42 defined by a plurality of circumferentially spaced flat sections 44 along the length of the projecting extremity 46. The lip would also comprise of a plurality of circumferentially spaced edges corresponding to the circumferentially spaced shoulders thereby allowing the magnet to be secured to the drain bolt by crimping the spaced edges over the spaced shoulders.

Standard non-magnetic drain bolts have a pilot member extended at the end of the threaded portion on the drain bolt to help guide the drain bolt into the oil pan hole. The pilot member is not threaded and is slightly smaller in diameter than the bolt body. The magnet 14 in the preferred embodiment of this magnetic drain bolt 10 is positioned within the pilot member 30 and extends slightly beyond the end of the pilot member. Excellent results are obtained when the sintered ferrite magnet extends 4.5 mm to 5.5 mm beyond the end of a standard 15 mm drain bolt and has a total height of approximately 10 mm and has resulted in retention forces represented by pull-out forces of approximately 1800 lbs.

The magnet 14 is magnetized after it is secured to the bolt body 12. Attaching a non-magnetized magnet to the bolt body 12 provides a much easier manufacturing process since the magnets do not need to be individually separated from other magnets due to their magnetic attraction to each other. This enables the magnetic drain bolts to be manufactured quicker, easier and at a lower cost by not having to separate unattached magnets from each other.

The magnetic drain bolt 10 is magnetized by touching the magnet on the end of the drain bolt to a magnetic transducer. The magnet 14 on the magnetic drain bolt 10 is magnetized in such a manner that the top end opposite the recess has opposite magnetic polarities placed thereon, thereby providing north and south polarities on the top end of the magnet 14. This provides a stronger magnetic attraction of the magnet 14 versus magnetizing the magnet to have opposite polarities on the top and bottom of the magnet.

The magnetic force of the magnetic drain bolt 10 degrades only 20–25 percent when the magnet is "knocked down" as compared to conventional magnetic drain bolts that degrade 40–60 percent after being knocked down. The magnetic drain bolts will typically be knocked down during the shipping process by the magnets touching other magnets. Eventually all the magnets on the drain bolts would be knocked down since normal use and contact with metallic objects will also knock down the magnet. The magnetic drain bolt 10 as herein disclosed maintains a high magnetic attraction after being knocked down due to the use of the sintered ferrite material.

Figure 8:
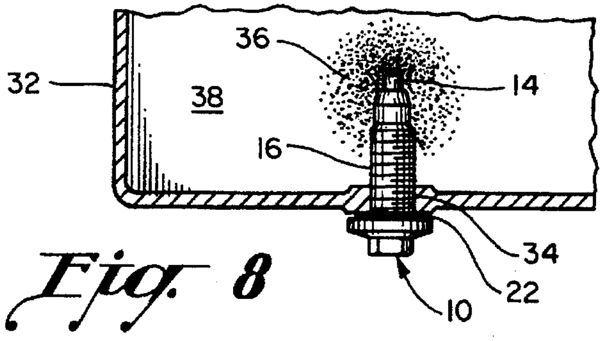
FIG. 8 is a cross-sectional view showing the magnetic drain bolt positioned in an oil pan of an engine.

Referring to FIG. 8, the magnetic drain bolt 10 is inserted into an oil pan 32 of an engine by first guiding the magnetic drain bolt 10 with the magnet 14 into a tapped hole 34 on the bottom of the oil pan 32 and then screwing the male-threaded member 16 into the tapped hole 34. The magnetic drain bolt is then tightened in place with a wrench fitted over the hexagonal head member 18 and is sealed with the O-ring seal 22. The magnetic drain bolt 10 is then in place to attract metallic particles and shavings 36 circulating in the oil 38 thereby preventing metallic particles and shavings from interfering with sensors located within the engine.

When the engine oil is replaced and/or drained, the magnetic drain bolt 10 is removed and is then wiped off with a towel or a rag to remove the metallic particles and shavings that were attached to the magnet 14. After the engine oil has been drained, the magnetic drain bolt 10 is then inserted back into the oil pan to continue to attract metallic particles and shavings.

Modifications and variations of the present invention are possible in light of the above teachings. It therefore is to be understood that within the scope of the appended claims, the invention may be practiced otherwise than as specifically described.

What is claimed and desired to be secured by Letters Patent is:

1. A magnetic drain bolt comprising:

a bolt body and a magnet, said bolt body comprising of a male-threaded member and a head member, said male-threaded member having an axial bore formed at a bottom end thereof for receipt of said magnet, said male-threaded member further having a lip means extending radially inward at a bottom edge of said axial bore;

said magnet consisting of a base and a projecting extremity, said base being sized to fit within said axial bore, said projecting extremity extending axially from the base and defining an indented shoulder means along a bottom edge of said base and along a top edge of said projecting extremity, wherein said base is fitted within said axial bore and said lip means extends over said indented shoulder means against the top edge of said projecting extremity thereby securing said base within the axial bore with the projecting extremity extending axially beyond the bottom end of said male-threaded member, the projecting extremity having a maximum transverse dimension not greater than the maximum transverse dimension of the base and at least certain peripheral portions of the projecting extremity having a transverse dimension less than the maximum transverse dimension of the base.

2. The magnetic drain bolt of claim 1, wherein said projecting extremity has a substantially circular diameter slightly smaller than the inner diameter of said lip means.

3. The magnetic drain bolt of claim 1, wherein said shoulder means comprises a plurality of circumferentially spaced shoulders and said lip means comprises a plurality of circumferentially spaced edges corresponding to said circumferentially spaced shoulders.

4. The magnetic drain bolt of claim 1, wherein the magnet comprises a sintered ferrite material.

5. The magnetic drain bolt of claim 1, wherein the magnet comprises a sintered aluminum-nickel-cobalt material.

6. The magnetic drain bolt of claim 1, wherein said male-threaded portion further includes an unthreaded pilot member extending beyond a bottom end of a threaded section on the bolt body, said pilot member having an outer diameter slightly smaller than an outer diameter of the threaded portion.

7. The magnetic drain bolt of claim 1, wherein said magnetic drain bolt further comprises an O-ring seal, said O-ring seal having an inner diameter sized to fit about the diameter of the male-threaded member and an outer diameter sized slightly smaller than a diameter of the head member, said O-ring seal being positioned about the male-threaded member and against the head member for sealing the magnetic drain bolt when secured to an oil pan of an engine.

8. A process of making a magnetic drain bolt comprising the steps of:

forming a bolt body with a male-threaded member and a head member, the male threaded member being formed with an axial bore at a bottom end thereof, forming a sintered slug of a magnetizable material with a base and a projection extremity, the base being formed having a depth slightly smaller than a depth of the axial bore and having a slightly smaller transverse dimension than an inner transverse dimension of axial bore, the projection extremity being formed having at least circumferential portions creating a transverse dimension slightly smaller than a transverse dimension of the base and extending axially from the base thereby defining a shoulder along a bottom edge of the base;

telescopically inserting the base of the sintered slug within the axial bore of the bolt body;

crimping a bottom edge of the male threaded member at a bottom edge of the axial bore over the shoulder and against the projecting extremity to create a lip whereby an inner transverse dimension of the lip is decreased to a dimension slightly less than a maximum transverse dimension of the base and slightly larger than a minimum transverse dimension of the projection extremity, wherein the crimping is done in a manner that does not exert an excessive force on the sintered slug that could damage the slug; and magnetizing the sintered slug.

9. The process of making a magnetic drain bolt as claimed in claim 8, wherein the magnetization of the sintered slug includes touching the sintered slug to a magnetic transducer.

10. The process of making a magnetic drain bolt as claimed in claim 8, wherein the magnetization of the sintered slug includes magnetizing a bottom end of the magnet opposite the base in such a manner that the bottom end has opposite magnetic polarities thereon.

* * * * *